(No Model.)

J. A. McGINTIE.
HARNESS ATTACHMENT.

No. 583,119. Patented May 25, 1897.

Witnesses:
G. A. Pennington
Hugh K. Wagner

Inventor:
Joseph A. McGintie,
by Paul Bakewell,
Atty.

UNITED STATES PATENT OFFICE.

JOSEPH A. McGINTIE, OF ST. LOUIS, MISSOURI, ASSIGNOR OF ONE-HALF TO HENRY H. ROSE, OF SAME PLACE.

HARNESS ATTACHMENT.

SPECIFICATION forming part of Letters Patent No. 583,119, dated May 25, 1897.

Application filed August 7, 1896. Serial No. 601,978. (No model.)

*To all whom it may concern:*

Be it known that I, JOSEPH A. McGINTIE, a citizen of the United States, residing at the city of St. Louis, State of Missouri, have invented a certain new and useful Improvement in Harness Attachments, of which the following is a full, clear, and exact description, reference being had to the accompanying drawings, forming a part of this specification, wherein—

Figure 1:
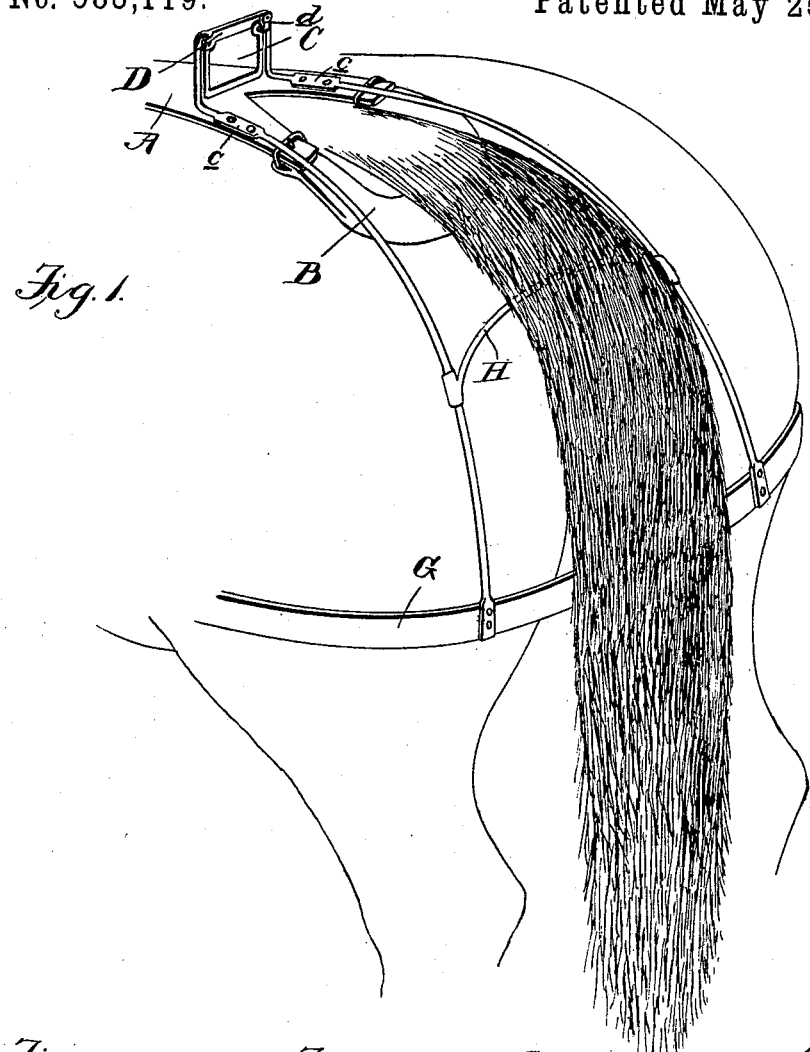
Figure 2:
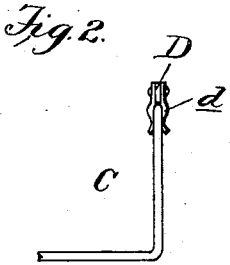
Figure 3:
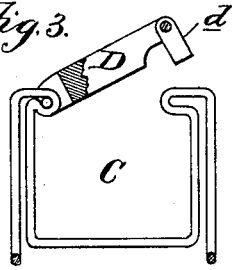
Figure 4:
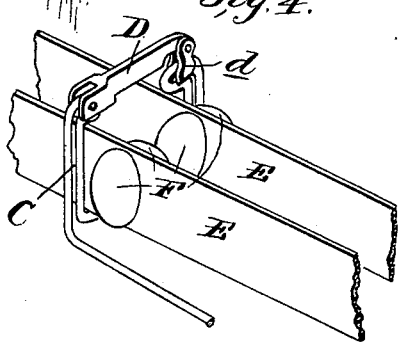
Figure 5:
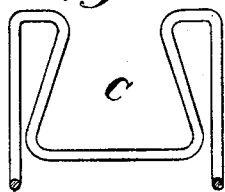

Figure 1 is a view illustrating the application of my invention. Fig. 2 is a detail side elevational view of the rein-support. Fig. 3 is a rear elevational view of the same. Fig. 4 is a detail view of the rein-support, showing the manner of coöperation of buttons on the reins therewith. Fig. 5 is a rear elevational view of a modified form of support.

This invention relates to a new and useful improvement in attachments to harness, the object being to provide means for preventing clamping of the reins by the animal's tail should said reins be caught.

Another object is to provide a support for the reins, so that the tail of the animal when being switched will not be liable to catch the reins.

Another object is to provide means to relieve the animal's tail from contact with the crupper, which oftentimes causes sores.

Another object is to provide means for holding the breech-strap in its proper position.

With these objects in view the invention consists in an attachment which is adapted to be applied to the harness, preferably to the crupper-strap, which is so constructed as to prevent the animal's tail from clamping the reins and also to provide a support for the reins, a support for the animal's tail to prevent its contact with the crupper, and means for holding the breech-strap in its proper position.

Other features of invention reside in the construction, arrangement, and combination of the several parts, all as will hereinafter be described, and afterward pointed out in the claims.

In the drawings, A indicates the back-strap, which is shown in the drawings as having a bifurcated rear end, to which the crupper B is buckled, as usual. In using my invention this crupper may be removed, as its office and function is lost. However, as a crupper is usually present on harness, I have so shown it here.

Secured to the back-strap or to the crupper (I have shown it secured to the former in the drawings) is my attachment, which consists, preferably, of a single piece of wire bent as shown, although in this connection I will say that the device might be made of two or more pieces of stiff material, not wire, and might be bent slightly different from the manner shown.

The upper portion of my attachment is formed as a rein-support C, which is composed of a U-shaped piece rebent upon itself, and then bent rearwardly and downwardly where the two arms are flattened, as at $c$, and secured to the back-strap or crupper through the medium of rivets or other securing devices. One of the ends of this U-shaped rein-support is preferably formed with an eye in which is pivoted a bridge-piece D, whose free end is provided with spring-jaws $d$, which are adapted to engage the upper end of the other member of the U and prevent the accidental displacement of the reins from their support. An upward pressure on the reins will disengage these spring-jaws and permit the reins to be removed from their support. By the presence of this bridge-piece I am enabled to provide the reins E with buttons F, which cannot pass beyond the support, and these buttons prevent the reins from having too much slack between the support and the bit, which is the cause of the reins being unintentionally caught under the ends of the shafts.

The ends of my attachment extend downwardly, preferably in a curved line in conformity to the shape of the animal, to the breech-strap G to which said ends are attached, they being flattened at this point to accommodate rivets or other attaching means.

By this attachment the breeching is held in its proper position relative to the haunches of the animal.

H indicates a cross-piece secured to the downwardly-extending portions of my attachment at a point below the crupper, if one is present, and intermediate the breeching and rein-support. This cross-piece holds the animal's tail out so that it cannot clamp the lines if the same are caught by the tail, and by reason of holding its tail out gives to the horse a nice appearance.

From the above it will be seen that an efficient support is provided for the reins, one which tends to hold the reins above the animal's tail, and one which, if the reins are caught under the animal's tail, will assist, by reason of its location, in a quick and ready removal of the reins.

By the presence of the bridge-piece D and the coöperating buttons on the reins too much slack is prevented at the forward ends of the reins. The cross-piece H may be used instead of a crupper, and by its use the reins cannot be clamped by the animal's tail, and the friction on the tail is thus reduced to a minimum. The breeching being held in its proper position is also advantageous, as the creeping of the breeching up or down in going downgrade is prevented.

The device being made substantially of a single piece of wire is cheap in cost, and its simplicity and lightness are advantages of no slight importance.

I am aware that many minor changes in the construction, arrangement, and combination of the several parts of my attachment can be made and substituted for those herein shown and described without in the least departing from the nature and principle of the invention.

Having thus described my invention, what I claim, and desire to secure by Letters Patent of the United States, is—

1. In an attachment for harness, the combination with the crupper-straps, of downwardly-curved pieces secured thereto and to the breeching, and a cross-piece secured to said curved portions, which cross-piece is adapted to extend under the animal's tail to prevent the reins from being clamped by the tail, should said reins be caught; substantially as described.

2. In an attachment for harness, the combination with a rein-support, which is provided with downwardly-curved ends, which are adapted to be secured to the breeching, and a cross-piece which is a support for the animal's tail; substantially as described.

3. In an attachment for harness, the combination with a rein-support, which consists of a U-shaped portion bent upon itself, and terminating in downwardly-curved ends which are adapted to be secured to the breeching, and a cross-piece forming a support for the animal's tail; substantially as described.

4. In an attachment for harness, the combination with a rein-support which is open at its top, of a bridge-piece pivoted at one side of the rein-support, and spring-jaws on the free end of said bridge-piece for engaging the other side of said rein-support; substantially as described.

5. In an attachment for harness, the combination with a rein-support, which consists of a U-shaped piece bent upon itself, forming an eye in the upper end of one of its members, and a keeper in the upper end of its other member, and a bridge-piece pivotally mounted in said eye and having means at its free end to detachably engage said keeper; substantially as described.

6. A harness attachment which is adapted to be secured to the harness near the crupper, the same consisting of a rein-support whose upper end is closed by a vertically-movable bridge-piece, said bridge-piece being temporarily held in its closed position by a latch, downwardly-curved portions extending from said rein-support, for holding the breeching in place, and a cross-piece for supporting the animal's tail; substantially as described.

In testimony whereof I hereunto affix my signature, in presence of two witnesses, this 1st day of August, 1896.

JOSEPH A. McGINTIE.

Witnesses:
HUGH K. WAGNER,
G. A. PENNINGTON.